Figure 1:
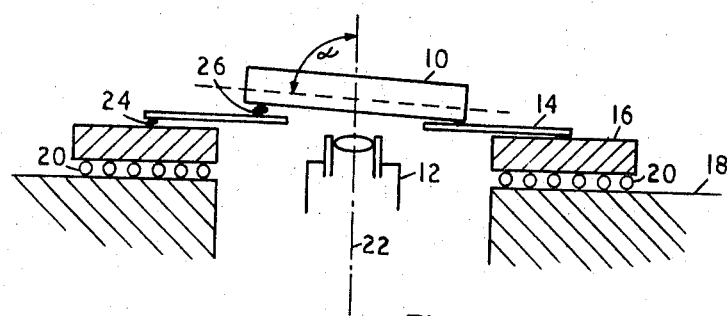

United States Patent [19]
Soames et al.

[11] 3,872,243
[45] Mar. 18, 1975

[54] METHOD AND APPARATUS FOR CHECKING MEASUREMENTS MADE IN IMAGE ANALYSIS SYSTEMS

[75] Inventors: Michael Richard Soames, Fulbourn; William Ralph Knowles; Donald William Braggins, both of Royston, all of England

[73] Assignee: Image Analysing Computers Limited, Melbourn, Royston, Hertsfordshire, England

[22] Filed: Apr. 28, 1972

[21] Appl. No.: 248,591

[30] Foreign Application Priority Data
May 18, 1971 United Kingdom............. 15677/71
May 18, 1971 United Kingdom............. 15678/71

[52] U.S. Cl............................ 178/6.8, 178/DIG. 36
[51] Int. Cl.............................................. H04n 7/18
[58] Field of Search................ 178/DIG. 1, DIG. 33, 178/DIG. 35, DIG. 36, DIG. 37, 6.8; 250/219 DF; 235/92 PD, 92 PC, 92 DN, 235/92 MT; 356/200, 237; 340/146.3 AQ

[56] References Cited
UNITED STATES PATENTS

| | | | |
|---|---|---|---|
| 3,049,588 | 8/1962 | Barnett........................ | 178/DIG. 33 |
| 3,056,032 | 9/1962 | Cannon....................... | 250/219 DF |
| 3,081,379 | 3/1963 | Lemelson.................... | 178/DIG. 1 |
| 3,216,311 | 11/1965 | Bibbero et al............... | 178/DIG. 36 |
| 3,389,789 | 6/1968 | Watson et al................. | 178/DIG. 1 |
| 3,674,926 | 7/1972 | Dewey et al................ | 178/DIG. 37 |

FOREIGN PATENTS OR APPLICATIONS
906,947 9/1962 United Kingdom............. 356/200

Primary Examiner—Howard W. Britton
Attorney, Agent, or Firm—Oblon, Fisher, Spivak, McClelland & Maier

[57] ABSTRACT

Methods and apparatus are described for performing tests on the results obtained by an image analysis system set to analyse features in a field. An analysis comprises the steps of scanning the field, generating a video signal, detecting the amplitude excursion of the latter and making measurements on the detected signal pulses e.g., to give a signal indicative of the total area of detected features.

The first test involves the insertion of a check field and the comparison of certain measured value signals obtained from scanning the check field, with known tone-value-signals for the check field.

A second test involves comparing a measured value signal of each field scan forming part of a complete analysis with at least one reference voltage, defining a range and generating a warning signal if the measured value signal lies outside the range.

A third test involves comparing a measured value signal obtained from the results of all the field scans forming a complete analysis, with at least one reference voltage defining a range and generating a warning signal if the measured value signal lies outside the range.

16 Claims, 13 Drawing Figures

3,872,243

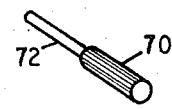

METHOD AND APPARATUS FOR CHECKING MEASUREMENTS MADE IN IMAGE ANALYSIS SYSTEMS

This invention concerns methods and apparatus for checking measurements made in image analysis systems adapted for routine testing involving the inspection and analysis of a large number of similar fields. One example of such use is in the analysis and checking of samples of steel for inclusion content.

An image analysis system arranged to operate in this manner must be linked with both sample handling equipment and data processing equipment. The overall system is consequently complex with the inevitable increase in the likelihood of errors due to drift, ageing, faults in components, electrical breakdown etc.

It is a first object of the invention to provide a method and apparatus for checking to ensure that an image analysis system is still operating within acceptable limits.

It is a second object of the invention to provide a method and apparatus for checking that each of the fields presented for analysis conforms within limits to the field-type under analysis.

It is a third object of the invention to provide a method and apparatus for checking that the results of an analysis on a succession of fields of a known field-type, when accumulated or averaged, fall within expected limits.

According to one aspect of the present invention a method of checking the measurements made by an image analysis system performing a sequence of tests on similar fields, comprises the steps of interrupting the sequence, inserting a check field and comparing the result obtained from measurements made on the check field with values obtained for the check field when the system is known to be operating correctly.

Conveniently the check field is automatically inserted at the end of a selected number of tests. By test is meant the one or more complete field scans necessary to allow the various parameter measurements to be made.

Thus where the test of a single specimen in fact involves measurements from a large number of fields obtained by scanning different regions of the specimen one or more times, the check field may be made available automatically at the end of each test. Where only one region of a specimen needs to be scanned (either one or more times) to perform a test on a specimen, the check field may be inserted after each test or after a number of such tests.

Where a specimen carrier is employed which is movable to effect loading and unloading of the specimens, the check field is conveniently movable therewith into the field of view of the imaging device. For example, it may automatically be moved into the field of view whenever the carrier occupies its load-unload position. Conveniently therefore the check field is carried by or mounted on the specimen carrier.

The check field may be inserted into the optical path of the imaging device at any convenient point, such as the normal focal plane at which each field is inserted or the focal plane of the field stop of the light system illuminating the region normally occupied by a field to be tested.

Preferably upper and lower limits are applied to the result obtained from scanning the check field to allow for tolerances within the overall system.

Preferably more than one parameter in the check field is measured. Different upper and lower limits may apply to the different results obtained from measuring the differing parameters. Furthermore the tolerance allowed on the measurement of one parameter may be different from that allowed on another.

A warning or alarm signal is preferably generated if any one of the parameters measured in the check field lies outside the limits imposed on the results. Conveniently provision is made for cancelling or indicating as incorrect, the results obtained from all the tests formed subsequent to the last check field measurement in the event that a warning signal is generated.

Where the fields are of one general type certain field characteristics or parameters will probably be known in advance, and this information can be used *inter alia* with other information to check the measurements subsequently made.

According therefore to another aspect of the present invention a method of checking a measured value obtained by scanning a succession of fields to produce a video signal, detecting same and making measurements on the detected signal pulses, comprises, comparing the measured value at the end of each $n$th field scan with a signal representing at least an upper limit defining a range and generating a warning signal if the measured value lies outside the range.

The range may be defined by a lower limit with which the value is also compared. The lower limit may be zero or a finite value.

$n$ may be equal to or greater than 1 and in the latter event, the $n$ field scans may be in respect of a single field (in which case the $n$ field scans comprise a test on that field) or one or more field scans of each of two or more fields (in which case the $n$ field scans comprise a test on the two or more fields).

Preferably a plurality of measurements are made in respect of a plurality of different parameters during each test (whether of one or more fields) and a separate comparison made for each parameter value and the warning signal generated if the comparison criterion for any one or more of the measured values is not satisfied. Conveniently a separate and unique warning signal is generated from the comparison of each of the measured values thereby to indicate which of the values fails to satisfy its comparison criterion.

A subsidiary check comprises generating a warning signal if during an analysis an edge of the specimen or an aperture defining the analysis area of a specimen, enters the field of view of the imaging device.

A further method of analysis involves the measurement of at least one parameter of each of a large number of similar fields for example all derived from one specimen. A succession of similar fields may be obtained by moving the specimen relative to an imaging device thereby presenting different regions of the specimen in the field of view of the imaging device. Measurements are made on a parameter of each field and the values obtained accumulated during the analysis to form an analysis output value for that parameter. The latter may be averaged by for example dividing by the number of fields.

According to a further aspect of the present invention in such a method the analysis output value is compared with a signal representing at least one limiting value defining a range and a warning signal is generated if the measured value lies outside the range.

Preferably the signal defining the limiting value is adjustable to vary the range.

Preferably separate, distinguishable warning signals are generated where two or more parameters are measured and separate comparisons made thereby to indicate which of the two or more analysis output values lies outside its range.

The warning signals may generated alarm signals of a visible or audible nature or both, or may be employed to perform a mechanical operation such as specimen selection/rejection.

Preferably the release of an analysis output value which lies outside its range is accompanied by distinguishing information. For example where the analysis output values are released as a print-out from an automatic printer, the generation of a warning signal may serve to alter the colour of the ink employed for printing out the value which lies outside its range. Alternatively a warning signal may generate a print-out at that end of the analysis indicating tha the results from that analysis may be incorrect.

According to a preferred feature of this further aspect of the invention the signal defining the upper and, if employed, the signal defining the lower limits for each parameter are adjustable by adjustment of the position of shorting or diode pins in a programme board. Such a board will hereinafter be referred to as a go/no-go board.

Where the measured parameter value is in the form of an analogue signal conveniently the upper and lower limits are defined by analogue signals such as voltages obtained from a potentiometer. Where however the measured value is in digital form, the upper and lower limiting values may be derived either from analogue voltages (for example from a potentiometer) and digital values obtained by analogue to digital conversion or digital greater-than and less-than comparators may be employed or preferably digital counters coupled to digital equivalence circuits may be employed in which an equivalence output signal indicates that a selected digital value has been reached in the output of the counter.

Figure 4:
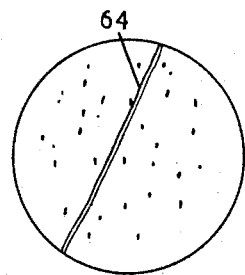
Figure 5:
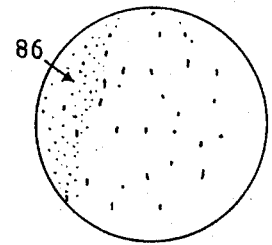
Figure 6:
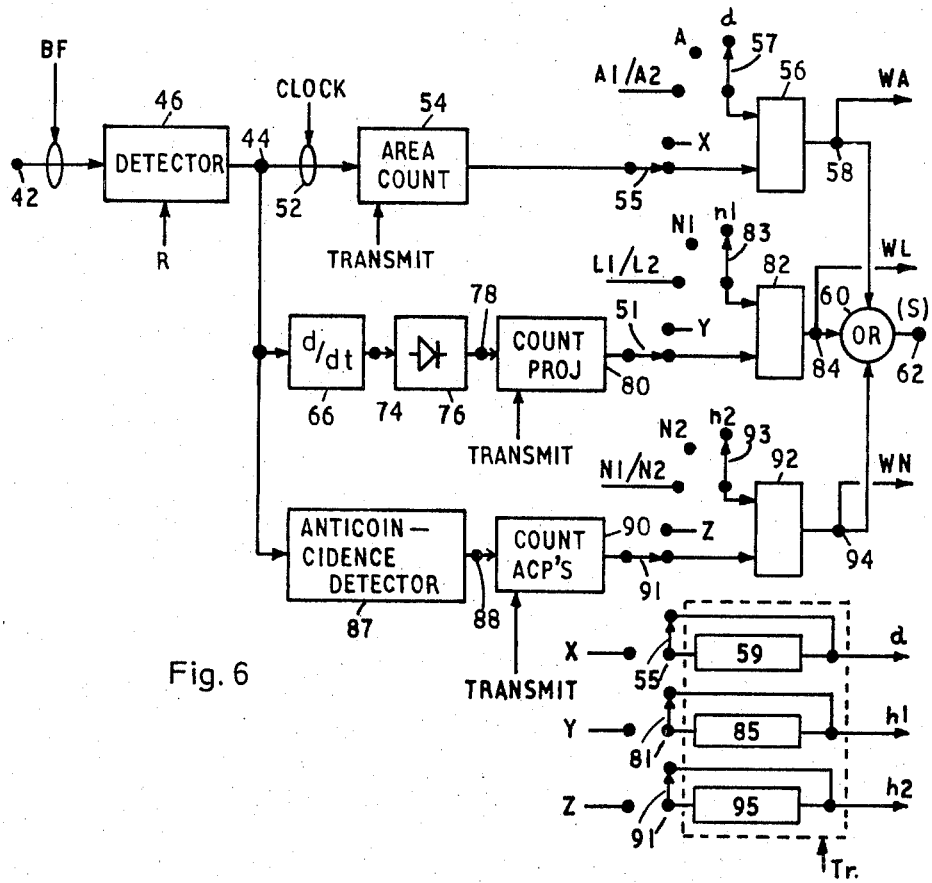
Figure 7:
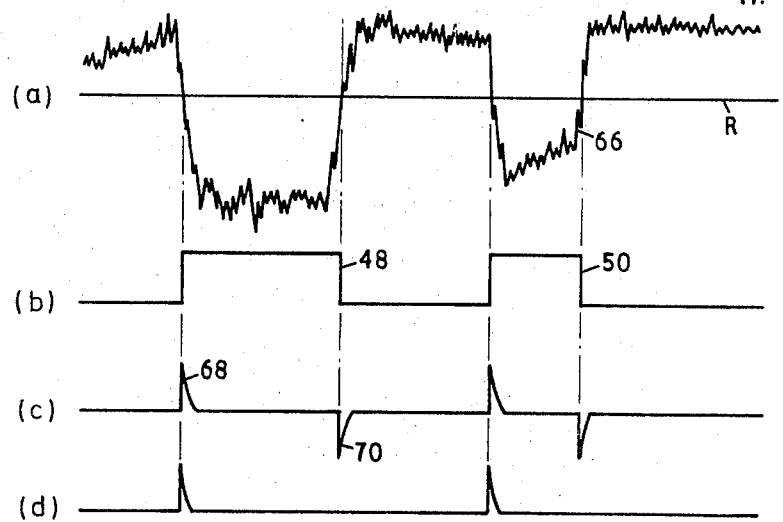
Figure 8:
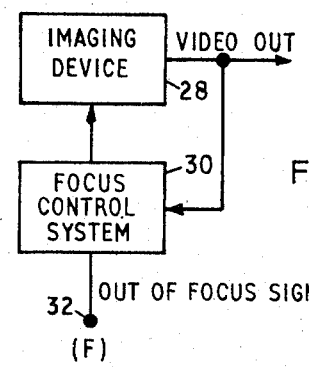
Figure 9:
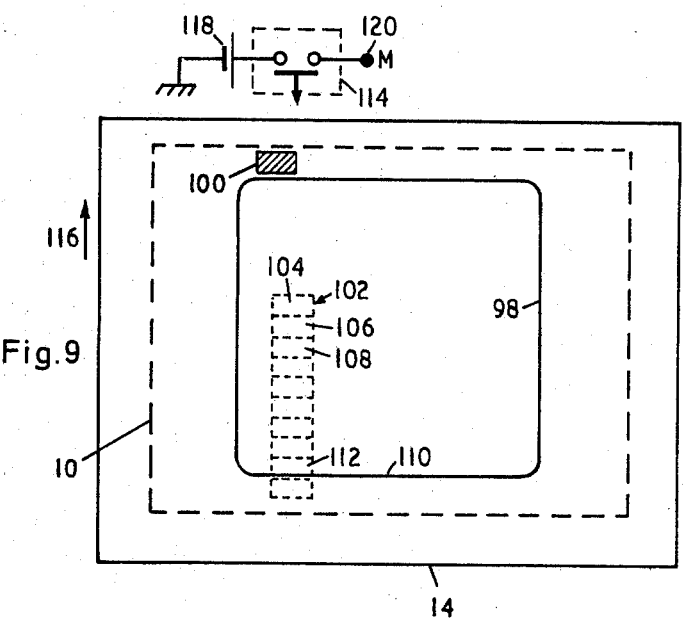
Figure 10:
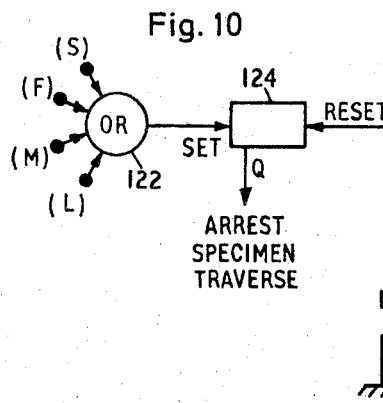
Figure 11:
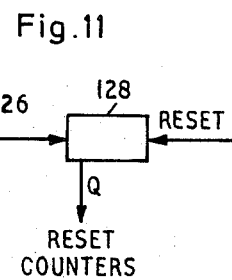

The invention will now be described by way of example with reference to the accompanying drawings in which:

FIG. 1 illustrates diagrammatically how a specimen may become tilted relative to the optical axis of an imaging device, FIGS. 2, 3, 4 and 5 illustrate how the same field type can appear totally different when subjected to various errors such as dirt, etc., FIG. 6 is a block circuit diagram of a warning signal generator which may be employed with an image analysis system adapted to examine steel samples for inclusion content, FIG. 7 illustrates waveforms obtainable at various points in FIG. 6, FIG. 8 is a block diagram of another part of the image analysis system, FIG. 9 illustrates how a further error can occur during analysis of a specimen, FIG. 10 is a block circuit diagram of a further portion of the image analysis system, FIG. 11 is a block circuit diagram of a still further portion of the image analysis system, FIG. 12 is a perspective view of a go/no-go board, and FIG. 12a illustrates a typical shorting pin employed with the board of FIG. 12.

Microscopic examination of polished steel specimens typically involves 500 tests per specimen. Conveniently a check field is inserted (as provided by the first aspect of the invention) at the end of each 500 tests and provision is conveniently made for additionally introducing the check field at any time by an operator control. Thus e.g., the system may be checked before the 500 tests are performed on the first of a number of specimens.

The specimens may be loaded onto a specimen carrier manually or, a number of specimens may be positioned in a store location and removed individually by mechanical handling means (not shown). The latter is conveniently arranged to remove each specimen from the specimen carrier after an analysis has been performed on it and despatch it to a second store location. Preferably a plurality of separate store locations (not shown) are available and each specimen is conveyed to a selected one of these stores depending on the results of the analysis performed on it.

Where the specimens are samples of polished steel the parameters usually of interest are sulphide area, oxide area for each of the oxide types and a general indication of the predominant inclusion type i.e., either sulfide or one of the oxides.

A circuit of part of an image analysis system is shown in FIG. 6. The video signal output from an imaging device (not shown) is applied to junction 42 and a detected video signal is obtained at junction 44 by the action of detector 46. The principle of detection is illustrated in FIGS. 7(a) and 7(b) where FIG. 7(a) illustrates a typical waveform of an amplitude modulated video signal as at junction 42 and FIG. 7(b) illustrates the detected video signal pulses obtainable at junction 44 with a reference voltage in detector 46 of value R. The amplitude modulation of the video signal at FIG. 7(a) is assumed to be white is positive and the pulses 48 and 50 are obtained by comparing the instantaneous amplitude with the reference voltage R and generating a pulse such as 48 or 50 for the duration of an amplitude modulation which is below the reference voltage R (i.e., corresponds to a region having a grey level darker than that represented by the reference voltage R).

The pulses 48 and 50 which appear at junction 44 are "chopped" by the opening and closing of a gate 52 operated by clock pulses. Each pulse 48 or 50 will thereby be converted into a series of short duration pulses the number of which will be proportional to the duration of the original pulse. The pulses so obtained are counted for a field scan in an area count circuit 54 which may be a simple counter.

General description of apparatus and faults which can develop.

In FIG. 1 a specimen 10 is carried by a stage movable (by motor means not shown) to present different regions of the specimen in the field of view of the objective 12 of an imaging device (not shown). The latter may for example be a microscope linked to a television camera.

The specimen 10 is supported on an aperture plate 14 which in turn is supported on the movable, apertured upper stage portion 16 which is supported above the lower base portion of the stage 18 by ball slides 20.

The stage portion 16 is capable of movement in two perpendicular directions to allow relative movement between specimen and imaging device in directions corresponding to X and Y axes and the motor means (not shown) operates to produce the stage movement in these two directions.

Tilted specimen surface

The optical axis 22 of the imaging device (not shown) is arranged to be perpendicular to the upper surface of the base 18. Any non-parallelism between the upper stage portion 16, the aperture plate 14 or the specimen 10 and this upper surface of base 18 will cause the lower surface of the specimen 10 to no longer be perpendicular to the optical axis 22. In FIG. 1 the apertured upper portion 16 is assumed parallel to the bse 18, but a particle of dirt such as 24 between the aperture plate 14 and the upper surface of the portion 16 or a particle of dirt 26 between the specimen 10 and the aperture plate 14 will cause the specimen 10 to become tilted. The angle should be 90° but in view of the tilt this angle will be less than 90°.

As the specimen 10 is moved across the field of view of the objective 12, the distance from the lower surface of the specimen 10 to the objective 12 will vary and will decrease with movement of the specimen from right to left. If the focus of the imaging device is correct for one position of the specimen 10 it will not be correct as the specimen moves and an automatic focussing system will therefore have to track the variation in focus and will have to generate a continuous correction signal.

An automatic focussing system has been described in our co-pending United States Patent Application Ser. No. 223,611. This system derives a control signal from at least part of the video signal output from an imaging device such as a television camera. As shown in FIG. 8 the video signal output from an imaging device 28 is applied to a focus control system 30 and the latter serves to adjust the focus of the imaging device. In the system described in our co-pending Application Ser. No. 3994/71, an additional electrical signal is obtained indicating that the image of a specimen is out of focus beyond the amount which a focus correction signal will correct, and this signal (F) is assumed to be available at junction 32. The objective 12 in FIG. 1 can be considered to form part of the imaging device 28 of FIG. 8. In this event an out of focus signal will appear at junction 32 (FIG. 8) if the focus control system 30 is unable to follow the variation in focus from field to field (i.e., the specimen tilt is too great) as the specimen 10 is moved relative to the objective 12.

FIGS. 2 to 5 illustrate other factors which will affect the results obtained from the measurements on a polished steel sample which is to be examined for non-metallic inclusion content.

Dust

Figure 2:
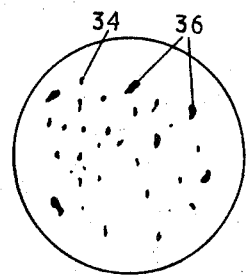

In FIG. 2 the non-metallic content is illustrated at 34 and in general will comprise small dark grey or light grey regions on what appears to be a white background. The total area of the non-metallic inclusion content of any given area of the specimen surface will rarely exceed a very small percentage of the given area. Typically this percentage will lie in the range 0.1 to 5 percent. An area measure of all detected grey regions having a grey level at least equal to that of the inclusions 34 will include area contributions from the dust particles such as 36 and the resulting area measure will therefore be higher than it should.

Incorrect mounting

Figure 3:
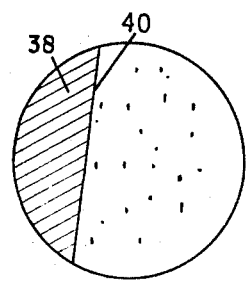

A similar error will occur if the field of view of the imaging device includes a contribution from the edge of the aperture in the aperture plate 14 such as is illustrated in FIG. 3. A similar effect is obtained if the specimen 10 does not completely cover the aperture so that at one point in the scanning of the area of the specimen within the aperture, an edge of the specimen is seen in the field of view. In either event, part of the field of view will be a dark grey or black as denoted by 38 and will be separated from the remainder of the field by an edge 40 which will either be the edge of the aperture or the edge of the specimen 10. It will be seen that only a very small portion of the edge of the aperture or a very small misalignment of the specimen 10 relative to the aperture can produce a large area of dark grey or black in one of the fields and an area measure for grey-black regions in that field will be very high as compared with that of a field containing only the inclusion content of the specimen.

Either of the faults illustrated in FIGS. 2 and 3 can be detected by comparing the area count signal from counter 54 for each field with a limit value (A) and generating a warning signal if the limit value is exceeded for any field. The limit value (A) is selected by switch 57 and its value is chosen so as to allow up to say 5 percent of the total area to be classed as inclusion contribution but if an area count from 54 greater than 5 percent is recorded the warning signal is generated.

Scratch marks

If a polished metal specimen is scratched, one or more of the fields during an analysis of the specimen will include a scratch mark such as illustrated at 64 in FIG. 4. Since the specimen is illuminated by incident light the scratch will appear as a dark grey or black line and on each line scan of the camera raster which intersects the image of the scratch mark 64 there will be a short duration amplitude modulation of the video signal (such as 66 in FIG. 7(a)). There will thus be a large number of extra detected video signal pulses 50 in the detected video signal appearing at junction 44.

An indication that a specimen may be scratched can be obtained by a second check system shown in FIG. 6. A differentiating circuit 66 produces a short pulse 68 from the leading edge of a detected video signal pulse such as 48 and a similar but opposite polarity pulse 70 at the trailing edge of each detected video signal pulse. The signal obtained at junction 74 is shown at FIG. 7(c). Alternate ones of the differentiated pulses may be eliminated by a suitable rectifying circuit shown diagrammatically at 76 in FIG. 6 and the signal obtained at junction 78 is shown at FIG. 7(d). The pulses at junction 78 are counted by a counter 80 whose value at the end of a field scan is proportional to the total horizontally projected inclusion length and at the end of the field the total count value is transmitted to a comparator 82 and compared with a preset value N1 corresponding to the largest total length signal likely to be obtained for such field. A signal appears at junction 84 if the count value transferred from 80 exceeds N1 and a signal at 84 constitutes another input to OR-gate 60 which will also produce a warning signal S at junction 62.

N1 is obtained by appropriate positioning of switch 83.

Cleaning and polishing marks and rust

Just as it is possible to know in advance the approximate percentage area of inclusion content in a polished steel specimen, it is also possible to known the approximate number of inclusions which should be present per unit area of the surface of the steel specimen if it is up to standard. Cleaning and polishing marks can appear as a finely divided particulate deposit on the surface of the steel, which will affect the inclusion count value. The prior knowledge of the number of inclusions present per unit area will allow a check to be made. When viewed under a microscope a finely divided deposit will appear as a large number of specks 86 and if a specimen contains drying marks one or more of the fields during an analysis of the specimen may appear as shown in FIG. 5. Rust on the surface will also result in areas of specks such as 86. Since the specks are small the contribution to the area and projection counts will only be small. They may therefore go undetected unless a third test is employed, namely, counting the number of discrete areas in the specimen surface which satisfy the detection criterion.

To this end an anti-coincidence counting circuit 87 of any conventional or well known type such as the type described in British Patent Specification No. 1,264,807 is supplied with the detected signal pulses from junction 44 and the count pulse derived thereby for each detected inclusion in the field, appears at junction 88. These count pulses are applied to an accumulating counter 90 and the count value at the end of the field is transferred to a further comparator 92 for comparison with a preset count value N2. N2 is set to the expected maximum number of inclusions for a specimen surface area equal to the surface area under analysis. If the field count exceeds N2 a signal appears at junction 94 and this constitutes a third input for OR-gate 60 to produce a warning signal at junction 62.

N2 is obtained by appropriate selection of switch 93.

Where the mark appears as a smudge, it will probably be detected on the area test.

In FIG. 9 the specimen 10 is shown mounted behind the aperture 98 of the aperture plate 14. A usual analysis involves the movement of the stage 18 (not shown in FIG. 9) carrying the aperture plate 14 in such a way that the imaging device sees first one small increment of the area and then another until the whole of the area within the aperture 98 has been covered. Sometimes however it is desirable to do an analysis on a limited region of the total area such as a strip denoted by the dotted outline 102. It is assumed that the strip is as wide as one field of view and that the stage is moved so that first area 104 is seen by the imaging device then 106, 108 etc., as successive fields. If the analysis comprises measurements from ten such adjacent fields 104, 106 etc., it is important that the initial starting point for the strip 102 is sufficiently far from the edge 110 to allow ten complete fields to be scanned before the edge 110 is reached. If this is not the case, one of the fields (112, as shown in FIG. 9) will be partly intersected by the aperture edge 110 and the analysis will be inhibited by the action of a micro switch 114 set to detect when the aperture plate 14 has reached a given position in the automatic movement of the stage. The microswitch 114 is shown connected in series with a source of voltage 118 and a junction 120 and a signal (M) appears at junction 120 when the aperture plate 14 reaches the extreme position in the direction of the movement denoted by the arrow 116. The dimensions of the aperture 98 and the overall size of the aperture plate 14 are selected so that the microswitch 114 is operated just before the edge 110 of aperture 98 enters the field of view of the imaging device.

If a signal appears at junction 120 before the requisite number of fields 104, 106 etc. have been presented to the imaging device (not shown) the signal at 120 overrides the stepping control for the stage (not shown) and inhibits the further movement of the stage in the direction shown by the arrow 116.

Although not shown one further check is employed in such an image analysis system and this comprises measuring the peak white amplitude of the video signal and comparing the measured value with a reference voltage. In this way the brightness of the illuminating source, the peak reflectivity of the specimen and the sensitivity of the camera may be monitored. A system for deriving a warning signal from a comparison of the peak white amplitude level with a reference voltage is described in our co-pending United States Patent Application No. 252,237 Image Analysing Computers Limited.

Use of warning signals

The appearance of any of the signals S, F or M or the appearance or a warning signal from a brightness detection device just described (such signal being referred to as L) is arranged to cause the specimen traverse to be arrested and in the event of some of these signals the computers or counters reset, since the results from the field containing either the error or during which a fault has developed will have already been accumulated with the results from the earlier part of the analysis. To this end signals S, F, M and L comprise inputs to an OR-gate 122 (FIG. 10) so that any will produce an output in the OR-gate 122 to set a bistable device 124 whose set output Q serves to arrest the specimen traverse. In this way the analysis sequence is inhibited and in general the offending field will comprise that within the field of view of the imaging device or will be adjacent to it.

Where the imaging device includes optical means for examining the field of view as for example an optical viewing system in a microscope it is possible to examine the portion of the specimen containing the offending field. In addition a television monitor driven by the camera output, may be employed. At the same time the signals F, M and L provide inputs to an OR-gate 126 (see FIG. 11) whose output serves to set a second bistable device 128 whose set output Q serves to reset the computers and counters. It is to be noted that the S signal does not constitute an input to OR-gate 126 but instead a fourth input is provided from a normally open push button switch 130 connected in series with a source of voltage such as a battery 132.

The push button switch 130 is made available to an operator of the system and in the event that the system has been arrested by an S signal it is possible for the operator to examine the specimen, decide whether or not to continue the analysis of the specimen and if so cause a reset signal to be applied to bistable 124 to allow the specimen traverse to resume.

If however the signal has been caused by for example a drying mark or a scratch, the operator may not wish to continue with the analysis of this specimen in which event the results of the analysis to date can be cancelled by depressing the push button 130 and applying an input to OR-gate 126.

The block circuit diagrams employed to describe the various checks which may be made during an analysis sequence, have been simplified and are intended only to describe the principle by which the checks may be made. It will be appreciated for example that an overall "inhibit" must be employed on all the warning signals for a period of time immediately after an analysis sequence has been initiated to allow the image analysis system to attain the best focus position and the correct operating level for the illumination system etc. To this end either a time delay is built into the system by which the alarm signals F, S M and L cannot serve to set the bistable device 124 and bistable device 128 for a given period of time after the overall system has been initiated at the start of an analysis swquence or the inhibit signal is maintained until the focus system has reached the so-called dead zone (see our co-pending United States Patent Application Ser. No. 223,611) and the light level is providing an output signal which lies between the two limits L1 and L2 (see our co-pending United States Patent Application Ser. No. 252,237). Conveniently a combination of the two methods of controlling the inhibit signal is employed whereby if the predetermined values of focus and light level have not been attained by a certain time an alarm is generated to draw this to the attention of the operator.

Although not in general shown, gating of the video signal, detected signal and count signals in the various circuits of FIG. 6 may be employed. Thus one gate is situated between input 42 and detector 44 to effect so-called blank framing, another may be siutated between gate 52 and area computer 54, a third between the rectifier 76 and projection counter 80 and a fourth between the anti-coincidence detector and the ACP counter 90. The gates are only opened during a selected portion of each line scan period to thereby eliminate unwanted portions of the video signal or detected signal (such as synchronizing pulses etc.).

As shown in FIG. 9 a specimen 100 for providing a check field, is carried on the aperture plate 14 and in accordance with the first aspect of the invention, the stage is driven by the motor means (not shown) so that the check specimen 100 occupies the field of view of the imaging device at the end of an analysis being performed on the specimen 10. After being focussed the check specimen is scanned and the results are compared with stored results $a$, $n1$ and $n2$ for the check specimen. The values $a$, $n1$ and $n2$ are stored in stores 59, 85, 95 (see FIG. 6) and applied to comparators 56, 82 and 92 by appropriate switching of switches 57, 83 and 93.

A stop signal (S) is generated in the event that the results from the scan of the check specimen are significantly different from the stored values. The stop signal (S) inhibits the analysis of the specimen since its generation indicates that the equipment has probably developed a fault.

1. Loading of correct parameter values for check field

Check field 100 is placed in the field of view and with the equipment operating correctly the values in counters 54, 80 and 90 are stored as signals $a$, $n1$ and $n2$ respectively.

To this end switches 55, 81 and 91 are operated into the other of the two positions, shown in FIG. 6 to present the counter outputs to the lower terminals of switches 55', 81' and 91'. The latter are also operated into the other of the two positions shown in FIG. 6 so that the counter outputs are supplied to each of three stores 59, 85, 95 which may be shift registers where the counter outputs are in binary form.

2. Use of stored values $a$, $n1$ and $n2$ to check results from check specimen on subsequent occasions After an analysis, check specimen 100 is again placed in field of view and scanned.

Switches 55, 57, 81, 83, 91 and 93 are operated into the positions shown in FIG. 6 and a transmit signal T is applied to the stores 59, 85 and 95. The correct values $a$, $n1$ and $n2$ appear at the outputs of the stores and (via switches 57, 83 and 93 respectively) at the comparators 56, 82 and 92 respectively, for comparison with the outputs from counters 54, 80 and 90.

Any difference (other than within a preset tolerance) between the current counter outputs and the stored signals $a$, $n1$ and $n2$ produces a warning signal at junctions 58, 84 and 94 respectively and the OR-gate 60 operates so as to produce a single warning/inhibit signal if any one warning signal appears.

In order not to lose the stored signals from stores 59, 85, 95 switches 55', 81' and 91' are switched into the positions shown in FIG. 6 so that the store outputs are connected to their inputs and transmission signal T permits recirculation of the information.

In accordance with the third aspect of the invention, the area count values for a succession of field scans are accumulated in the counter 54, and likewise the projected length counts and the totals of the number of inclusions counted, in counters 80 and 90 respectively. With switches 57, 83 and 93 in their third position, upper and lower area limits A1 and A2 are compared in comparator 56 with the accumulated area count from 54 and a warning signal (WA) generated if the area count from 54 is outside these limits. Likewise, switch 84 supplies limits L1 and L2 to comparator 82 and switch 93, limits N1 and N2 to comparator 92.

In a preferred embodiment illustrated in FIG. 12 the limits A1, A2; L1, L2 and N1, N2 imposed on the accumulated count values are set up on a so-called go/no-go board generally designated 62. This may be in the form of a plug-in board but may alternatively form part of a control panel for the image analysis system.

The go/no-go board is made up of four sets of contacts each set comprising a first layer of contacts with the contacts lying in one direction and a second layer spaced from the first layer with the contacts lying in a perpendicular direction and forming a so-called programme board. Inter-connection between a contact in one layer with a contact in another layer is obtained by inserting a plug having a conductive portion which intersects and engages with the two contacts and forms an electrical connection between the two. Alternatively "Jack-type" plugs may be employed so that the two contacts may be interconnected by a diode.

In order to provide a high and a low value two vertical contacts are provided in each contact set in the board 62. Each set of contacts in the board is similar and one one set (that for the area comparator) will be described in detail since the others have the same pattern.

The set comprises two vertical contacts 64 and 66 and ten horizontal contacts in a different layer generally designated 68. Inter-connection between contacts 64 and any of the contacts 68 is achieved by a plug shown in more detail in FIG. 12(a), as comprising an insulating holder 70 and a protruding conductive portion or pin 72.

In the same way inter-connection between the other vertical contact 66 and one of the contacts 68 is achieved by a second pin 74. Pin 74 is the same general form as pin 70.

Since it is unlikely that the same range of values will be applicable for the various comparisons to be made by comparators 56, 82 and 92, it is to be understood that separate contacts 68 may be provided for each of the three sets of contacts employed in the go/no-go board of FIG. 12.

Different voltages are applied to the different contacts in layer 68 and by selecting one of the holes in the column A1 so an appropriate voltage will appear at contact 64 corresponding to the upper limit A1 required for comparator 30. Likewise the value A2 can be selected from the other column of holes so that the appropriate voltage for A2 appears at contact 66. The voltages may be converted into digital signals by suitable analogue to digital conversions if digital values of area etc. have been accumulated. (Alternatively the signals applied to the various contacts 68 may be digital in form to enable direct comparison with digital values from the accumulators).

By virtue of similar arrangements of contacts in the sections entitled Intersects and Number on the board 62, so limit values (analogue or digital) L1 and L2, and N1 and N2 can be obtained.

Preferably the values applied to the horizontal contacts in each of the sets are adjustable to provide for different ranges.

The results from an analysis comprising the measurements from a plurality of fields are printed out by a print-out device (not shown) and to this end the signals supplied from the counters 54, 80 and 90 are supplied in turn to the print-out device. In the absence of a corresponding warning signal WA, WL or WN for that total count value, the value is printed-out in black. If a warning signal for the count value is generated, this is supplied to the print-out device to change the ink colour to red for that particular count value print-out.

It is to be understood that the field parameter measurements obtained by the circuit of FIG. 6 are only representative and the invention may be applied to the measurement of any field parameter. Furthermore, one parameter value may be altered by another to provide a normalised or average value of the first. Thus for example an average area signal may be obtained by dividing the total area value from counter 54 by the total feature count from 90. The average value signal so obtained may then be compared with new limits (not shown) and another warning signal generated if the average value lies outside the range defined by the new limits.

In another type of analysis the most extreme value of a parrameter measured for a number of successive fields or a combination of a limited number of the most extreme values so obtained, may be employed as the field parameter value at the end of the analysis.

The number of fields comprising an analysis may be fixed or may be as many as are necessary to provide sufficient information relating to the specimen. Thus the accumulated values in counters 54, 80 etc. may be continuously compared with limits A1, L1 etc. so that a warning signal WA, WL etc. is generated as soon as any of the accumulated values exceeds its upper limit.

By so doing, the time required to analyse a given specimen may be reduced in the event that at an early stage in the analysis, one of the accumulated values exceeds its limit. The accumulated values may be continuously averaged so that the limits A1, L1 etc. may be set as percentages; i.e., percentage area of inclusions, etc. By "continuous" is included the accumulation of the value for each field and the comparison of the new accumulated value at the end of each field.

As a further modification, the comparisons whether at the end of each field or at the end of a fixed number of fields may be made sequentially in a fixed order by a single comparator (not shown) to which appropriate limits are supplied in sequence for each comparison.

We claim:

1. A method of checking measurement made by an image analysis system performing a sequence of tests on similar fields, wherein each test includes
   scanning an image of a field,
   generating a video signal from the scanning,
   detecting the video signal amplitude excursions to produce detected signal pulses,
   making measurement on the detected signal pulses, comprising, in combination, the steps of:
   inserting a check field,
   scanning an image of the check field to produce a video signal thereof,
   making measurements on the detected signal pulses resulting from the check field content, and
   comparing the results obtained from the measurements made on the detected signal pulses for the check field with values obtained for the latter when the system is known to be operating correctly.

2. The method as set forth in claim 1 wherein the check field is inserted at the end of the sequence of tests.

3. The method as set forth in claim 1 wherein a warning signal is generated if the measurements on the check field differ from those made when the equipment is operating correctly.

4. The method as set forth in claim 3 wherein the generation of a warning signal causes the results of at least the last test to be identified as erroneous.

5. The method as set forth in claim 3 in which the generation of a warning signal causes the results of at least the last test to be inhibited.

6. A method of checking a measured value signal obtained by
   scanning the image of each of a succession of fields,
   generating a video signal from the scanning,
   detecting the amplitude excursions of the video signal to produce detected signal pulses, and
   making measurements on the detected signal pulses to produce said measured value signal comprising, in combination, the steps of:
   generating a reference signal representing at least an upper limit defining a range,
   comparing the measured value signal at the end of each $n$th field scan with the reference signal, and
   generating a warning signal if the measured value signal lies outside the range.

7. The method as set forth in claim 6 wherein the range is defined by a second reference signal defining a lower finite limit.

8. The method as set forth in claim 6 wherein the value of $n$ is unity.

9. The method as set forth in claim 6 wherein at least one other measured value signal is obtained by making further measurements on the detected signal pulses and each measured value signal is compared with a signal representing at least an upper limit defining a range therefor, and the warning signal is generated if any one of the measured value signals lies outside its respective range.

10. A method of checking a measured value signal obtained during an analysis performed by scanning the image of each of a succession of different fields all derived from a single specimen, generating a video signal from the scanning of each field, detecting the amplitude excursions of the video signal to produce detected signal pulses, and making measurements on the detected signal pulses, comprising, in combinatioon, the steps of:
generating two reference signals representing the upper and lower limits of a range,
comparing the measured value signal from the analysis with the reference signals, and
generating a warning signal if the measured value lies outside the range.

11. The method as set forth in claim 10 wherein the reference signals are adjustable in value to alter the range.

12. The method as set forth in claim 10 wherein a warning signal serves to operate a specimen selection-rejection device to reject the specimen just analysed.

13. The method as set forth in claim 10 wherein the signals defining a range are adjustable.

14. An apparatus for checking measurements made by an image analysis system which performs a sequence of tests on similar fields, said apparatus comprising:
means for scanning the image of a field,
means for generating a video signal from said scanning,
means for detecting any video signal amplitude excursions to produce detected video signal pulses,
means for making measurements on the detected signal pulses corresponding to said video signal amplitude excursions, said means for making measurements including;
means for inserting a check field,
means for forming an image thereof,
means for scanning the image of the check field to produce a video signal thereof,
means for detecting any video signal amplitude excursions from said video signal produced by scanning said check field to produce detected signal pulses,
means for making measurements on the detected signal pulses corresponding to said video signal amplitude excursions resulting from the check field content, and
means for comparing the results obtained from the measurements made on the detected signal pulses for the check field with values obtained for the latter when the system is known to be operating correctly.

15. An apparatus for checking a measured value signal comprising:
means for scanning the image of each of a succession of fields,
means for generating a video signal from said scanning,
means for detecting any amplitude excursions of said video signal to produce detected signal pulses, and
means for making measurements on said detected signal pulses corresponding to said amplitude excursions of said video signal, said means for making measurements including;
means for generating a reference signal representing at least an upper limit defining a range,
means for comparing said measured value signal at the end of each $n$th field scan with the reference signal, and
means for generating a warning signal if the measured value signal lies outside the range.

16. An apparatus for checking a measured value signal obtained during an analysis performed by scanning the image of each of a succession of different fields all derived from a single specimen, generating a video signal from the scanning of each field, detecting any amplitude excursions of the video signal to produce detected signal pulses, and making measurements on the detected signal pulses corresponding to the amplitude excursions of the video signal, comprising:
means for generating two reference signals representing the upper and lower limits of a range,
means for comparing the measured value signal from the analysis with the reference signals, and
means for generating a warning signal if the measured value lies outside the range.

* * * * *